(12) United States Patent
Lee

(10) Patent No.: US 8,300,539 B2
(45) Date of Patent: Oct. 30, 2012

(54) SWITCHING DEVICE AND LOOPBACK DETECTING METHOD

(75) Inventor: Chun-Chi Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 317 days.

(21) Appl. No.: 12/773,017

(22) Filed: May 4, 2010

(65) Prior Publication Data

US 2011/0255419 A1 Oct. 20, 2011

(30) Foreign Application Priority Data

Apr. 16, 2010 (CN) .......................... 2010 1 0148814

(51) Int. Cl.
*H04J 3/14* (2006.01)
(52) U.S. Cl. ....................................... 370/249; 370/242
(58) Field of Classification Search .................. 370/249, 370/242
See application file for complete search history.

(56) References Cited

U.S. PATENT DOCUMENTS

| 7,124,330 | B2 * | 10/2006 | Wong et al. ...................... 714/43 |
| 7,701,862 | B2 * | 4/2010 | Arunachalam et al. ........ 370/249 |
| 8,009,571 | B2 * | 8/2011 | Arunachalam et al. ........ 370/249 |
| 2003/0115368 | A1 | 6/2003 | Wu |
| 2007/0121518 | A1 * | 5/2007 | Arunachalam et al. ........ 370/249 |
| 2011/0007739 | A1 * | 1/2011 | Diab et al. ..................... 370/389 |

* cited by examiner

*Primary Examiner* — Albert T Chou
(74) *Attorney, Agent, or Firm* — Altis Law Group, Inc.

(57) ABSTRACT

A switching device transmits a link code word to the partner device by one Ethernet port of the switching device for automatic negotiation with a partner device. The switching device receives a first response link code word, changes the link code word, transmits the changed link code word to the partner device, and receives a second response link code word. The switching device determines the Ethernet port of the switching device experiences loopback upon the condition that the first response link code word is unequal to the second response link code.

7 Claims, 4 Drawing Sheets

SWITCHING DEVICE AND LOOPBACK DETECTING METHOD

BACKGROUND

1. Technical Field

Embodiments of the present disclosure relate to switching devices, and more particularly to a switching device and a loopback detecting method thereof.

2. Description of Related Art

Switches are widely employed in network access. Generally, a switch includes a switching integrated circuit (IC), a plurality of ports connected to the switching IC, and additional circuits. Port loopback is one important failure reason of the switching IC. Loopback is (sometimes spelled loopback) is generally used to describe methods or procedures of routing electronic signals, digital data streams, or other flows of items, from their originating facility quickly back to the same source entity without intentional processing or modification.

Generally, the switching IC can not detect the loopback of the ports and the switches including the switching ICs can not avoid damage of the switching IC caused by the loopback failure. Other switches employ a specific detecting circuit to detect the loopback which increases the product cost and complexity of the switches.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
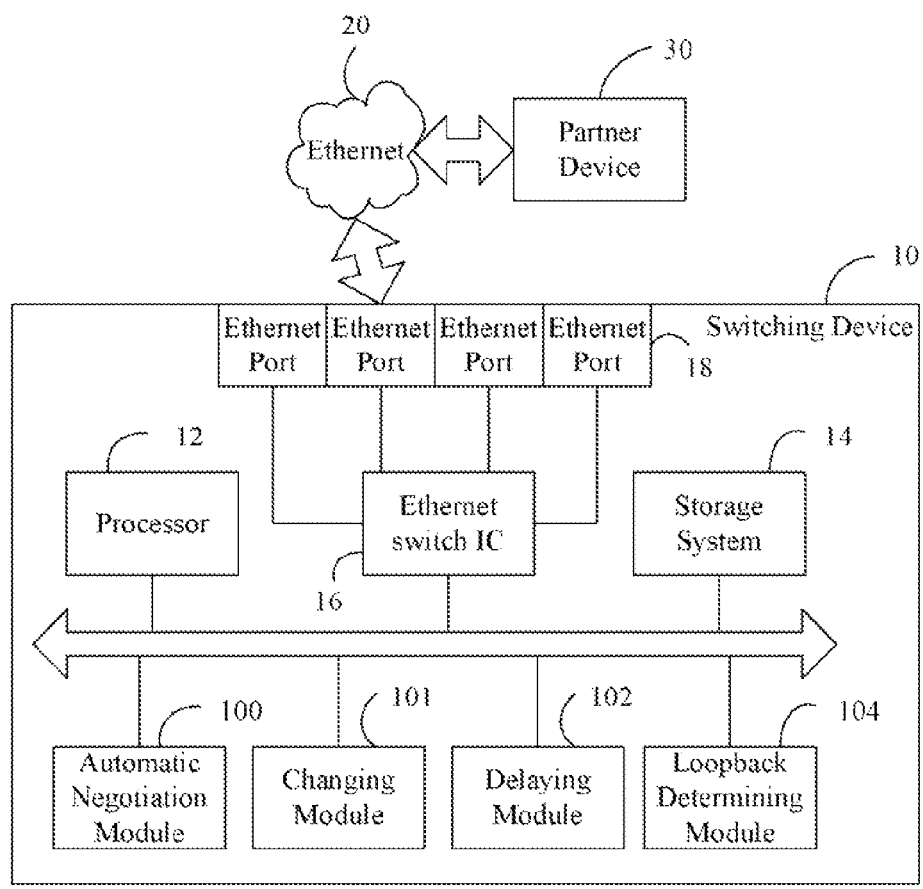
FIG. 1 is a schematic diagram of environment and the functional modules of one embodiment of a switching device of the present disclosure.

FIG. 1 is a schematic diagram of environment and functional modules of one embodiment of a switching device 10 of the present disclosure. The switching device 10 communicates with a partner device 30 by an Ethernet 20. In one embodiment, the switching device 10 can be a network devices that employs an Ethernet switch integrated circuit (IC) to achieve a switching function, such as an Ethernet switch, an Ethernet router, or an Ethernet gateway. The partner device 30 can be a network device in the Ethernet 20, such as a switch, a router, a gateway, or a personal computer.

The switching device 10 and the partner device 30 can automatically negotiate with each other. The automatic-negotiation is an Ethernet procedure by which two connected devices, for example, the switching device 10 and the partner device 30, select common transmission parameters, such as speed and a duplex mode. In this process, the connected devices first share their capabilities as for these parameters using a 16-bit logical word and then select the fastest transmission mode that they both support. The 16-bit logical word is called a link code word.

Figure 2:
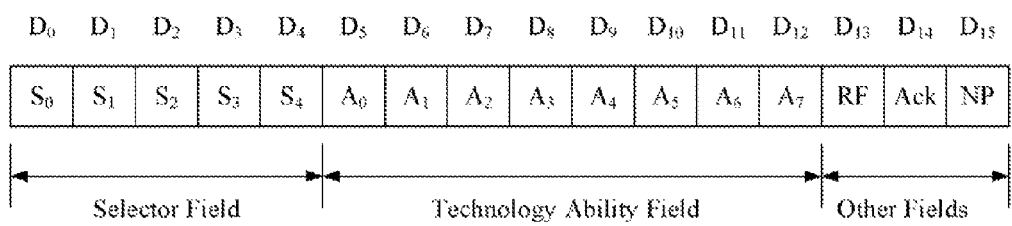
FIG. 2 is a schematic diagram of a link code word employed by the switching device for automatic negotiation with a partner device in FIG. 1.

The link code word may be a base link code word or any one of additional link code words. FIG. 2 is a schematic diagram of the base link code word employed by the switching device 10 for the automatic-negotiation with the partner device 30 in FIG. 1. The link code word has 16 bits, namely $D_0, D_1, D_2, \ldots, D_{15}$ shown in FIG. 2. For example, the base link code word may be 0000111000000110.

In detail, bit 0 to bit 4, namely $S_0, S_1, S_2, S_3, S_4$ shown in FIG. 2, collectively constitute a selector field indicating employed standard that is selected from, for example, IEEE 802.x protocols. Bit 5 to bit 12, namely $A_0, A_1, A_2, A_3, A_4, A_5, A_6, A_7$ shown in FIG. 2, collectively constitute a technology ability field indicating the possible modes of operations among the 100BASE-T and 10BASE-T modes. Bit 13 to bit 15 respectively represent a remote fault (RF) field, an acknowledgement (Ack) field and a next page (NP) field.

For example, if the switching device 10 uses IEEE 802.3 protocol, the selector field may be 00001. If the switching device 10 uses IEEE 802.9 protocol, the selector field may be 00010. $A_0, A_1, A_2, A_3, A_4, A_5, A_6, A_7$ in the technology ability field are detailedly defined in Ethernet protocols. For example, if the switching device 10 uses the IEEE 802.3 protocol, $A_0$ indicates the switching device 10 supports 10BASE-T, $A_1$ indicates the switching device 10 supports 10BASE-T in full duplex, $A_2$ indicates the switching device 10 supports 100BASE-TX, $A_3$ indicates the switching device 10 supports 100BASE-TX in full duplex, $A_4$ indicates the switching device 10 supports 100BASE-T4. 10BASE-T, 100BASE-TX, and 100BASE-T4 are general Ethernet media standards. For example, if the switching device 10 supports 10BASE-T and 10BASE-T in full duplex, the technology ability field may be 11000000.

The RF field is set to 1 when the switching device 10 detects a link failure of the switching device 10 and the partner device 30. The Ack field is set to 1 to indicate the correct reception of the link code word from the partner device 30. The NP field is used to indicate the intention of sending other additional link code words after the base link code word.

In the embodiment, the additional link code word comprises message link code word and unformatted link code word. The additional link code words are 16-bit words encoded in the same way as the base link code words. The first eleven bits of the additional link code word are data, while their second-to-last bit indicates the additional link code word is the message link code word or the unformatted link code word. The last bit of the additional link code word indicates the presence of the additional link code word.

Referring back to FIG. 1, the switching device 10 includes a processor 12, a storage system 14, an Ethernet switch IC 16, and a plurality of Ethernet ports 18. Only four Ethernet ports are shown in FIG. 1 for simplicity. The Ethernet switch IC 16 connects to the Ethernet 20 by the Ethernet ports 18 to achieve the switching function of the switching device 10. In one embodiment, the switching device 10 further has a loopback detection function to detect whether the Ethernet ports 18 experience loopback. Here, a loopback Ethernet port means the Ethernet port receives exactly what it transmits.

In one embodiment, the switching device 10 includes an automatic negotiation module 100, a changing module 101, and a loopback determining module 104. Those modules may include one or more computerized instructions stored in the storage system 14 and executed by the processor 12. Function description of those modules is shown in detail description of FIG. 3 and FIG. 4.

The automatic negotiation module 100 transmits a link code word related to the Ethernet switch IC 16 to the partner device 30 by one of the Ethernet ports 18 for automatic negotiation with the partner device 30. The automatic negotiation module 100 receives and records a first response link code word corresponding to the automatic negotiation. The changing module 101 changes the link code word related to the Ethernet switch IC 16.

The automatic negotiation module 100 further transmits the changed link code word to the partner device 30 by the one of the Ethernet ports 18 for automatic negotiation with the partner device 30. The automatic negotiation module 100 determines if the automatic negotiation by the changed link code word is successful. The loopback determining module 104 further determines the one of the Ethernet ports 18 does not experience loopback upon the condition that the automatic negotiation by the changed link code word is unsuccessful.

The automatic negotiation module 100 receives and records a second response link code word corresponding to the automatic negotiation by the changed link code word when the automatic negotiation by the changed link code word is successful. The loopback determining module 104 determines the one of the Ethernet ports experiences loopback upon the condition that the first response link code word is unequal to the second response link code. The loopback determining module 104 further determines the one of the Ethernet ports 18 does not experience loopback upon the condition that the first response link code word is equal to the second response link code.

In one embodiment, the switching device 10 further includes a delaying module 102. The delaying module 102 presets a delaying time period. The automatic negotiation module 100 further determines if the partner device 30 requests to re-negotiate with the switching device 10 during the delaying time period. The loopback determining module 104 further determines the one of the Ethernet ports 18 does not experience loopback upon the condition that the partner device 30 requests to re-negotiate with the switching device 10 during the delaying time period.

The changing module 101 changes the link code word related to the Ethernet switch IC 16 upon the condition that the partner device 30 does not request to re-negotiate with the switching device 10 during the delaying time period.

Figure 3:
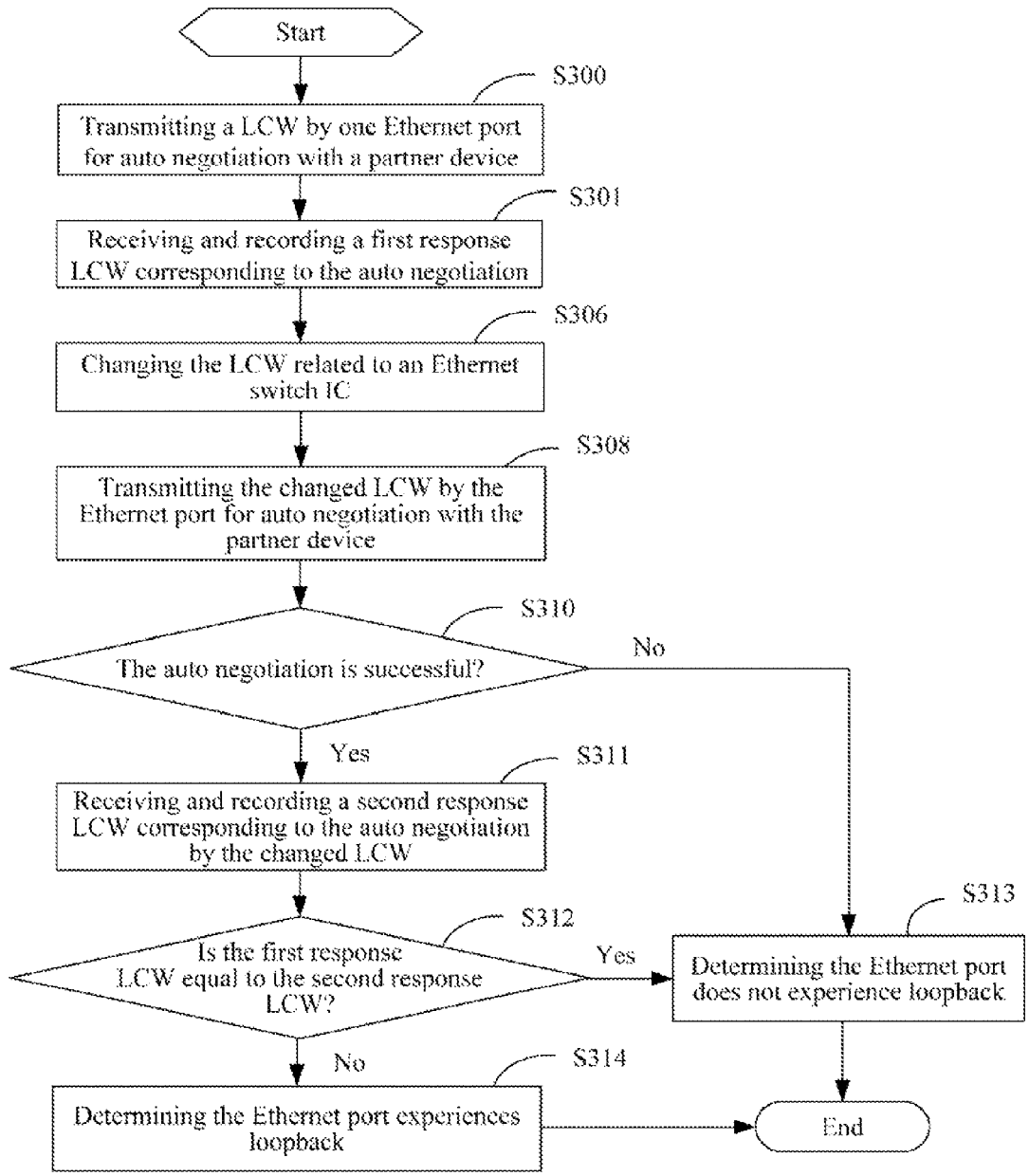
FIG. 3 is a flowchart of a loopback detecting method of one embodiment of the present disclosure.

FIG. 3 is a flowchart of a loopback detecting method of one embodiment of the present disclosure. The flowchart is executed by the modules of FIG. 1. Depending on the embodiment, additional blocks may be added, others deleted, and the ordering of blocks may be changed while remaining well within the scope of the disclosure.

In block S300, the automatic negotiation module 100 transmits a link code word related to the Ethernet switch IC 16 to the partner device 30 by one of the Ethernet ports 18 for automatic negotiation with the partner device 30. For example, the automatic negotiation module 100 transmits 0000111000000110 to the partner device 30.

In block S301, the automatic negotiation module 100 receives and records a first response link code word. As such, if the Ethernet port 18 does not experience loopback, then the first response link code word is transmitted by the partner device 30, such as 0000111111000110. If the Ethernet port 18 experiences loopback, then the first response link code word is transmitted by the automatic negotiation module 100 itself, such as 0000111000000110.

In block S306, the changing module 101 changes the link code word related to the Ethernet switch IC 16. In one embodiment, the changing module 101 can randomly changes 8 bits of the technology ability field of the link code word related to the Ethernet switch IC 16 to a different one, except changes A0A1A2A3A4 to 00000. The changing module 101 can randomly change the base link code word or the additional link code words. For example, the changing module 101 randomly changes 0000111000000110 to 0000110000000110.

It is noted that the change is limited by the Ethernet switch IC 16. For example, the Ethernet switch IC 16 may not permit to change some of the bits of the technology ability field if the Ethernet switch IC 16 does not support the ability of the bit. For example, the Ethernet switch IC 16 does not support 100BASE-T4 and $A_4$ of the technology ability field of the link code word cannot be changed. Therefore, the ability indicated by the changed link code word is also supported by the Ethernet switch IC 16.

In block S308, the automatic negotiation module 100 transmits the changed link code word, such as 0000110000000110, to the partner device 30 by the one of the Ethernet ports 18 for automatic negotiation with the partner device 30. In block S310, the automatic negotiation module 100 determines if the automatic negotiation is successful. As the abilities indicated by the changed link code word are also supported by the Ethernet switch IC 16, the automatic negotiation according to the changed link code word can be successfully done if the Ethernet port 18 experiences loopback.

On the contrary, the automatic negotiation according to the changed link code word may be successful or may be unsuccessful if the Ethernet port 18 does not experience loopback. For example, if the partner device 30 can match the changed link code word, the automatic negotiation according to the changed link code word will be successful. If the partner device 30 cannot match the changed link code word, the automatic negotiation according to the changed link code word will be unsuccessful.

If the automatic negotiation according to the changed link code word is unsuccessful, then in block 5313, the loopback determining module 104 determines the Ethernet port 18 does not experience loopback.

If the automatic negotiation according to the changed link code word is successful, then in block 5311, the automatic negotiation module 100 records a second response link code word corresponding to the automatic negotiation by the changed link code word. As such, if the Ethernet port 18 does not experience loopback, then the second response link code word is transmitted by the partner device 30, such as 0000111111000110. If the Ethernet port 18 experiences loopback, then the second response link code word is transmitted by the automatic negotiation module 100 itself, such as 0000110000000110. Then, there are three conditions happen according to whether the Ethernet port 18 experiences loopback or not.

First, the Ethernet port 18 does not experience loopback when the automatic negotiation module 100 records the first response link code word, and the Ethernet port 18 experiences loopback when the automatic negotiation module 100 records the second response link code word. The first response link code word is the link code word from the partner device 30, such as 0000111111000110. The second response link code word is the changed link code word by the changing module

101, such as 0000110000000110. Therefore, the first response link code word is unequal to the second response link code word.

Second, the Ethernet port 18 experiences loopback when the automatic negotiation module 100 records the first response link code word, and the Ethernet port 18 also experiences loopback when the automatic negotiation module 100 records the second response link code word. The first response link code word is the link code word before the change of the changing module 101, such as 00001110000000110. The second response link code word is the changed link code word by the changing module 101, such as 0000110000000110. Therefore, the first response link code word is also unequal to the second response link code word.

Third, the Ethernet port 18 does not experience loopback when the automatic negotiation module 100 records the first response link code word, and the Ethernet port 18 also does not experience loopback when the automatic negotiation module 100 records the second response link code word. Both of the first response link code word and the second response link code word are the link code word from the partner device 30, such as 0000111111000110. Therefore, the first response link code word is equal to the second response link code word.

Therefore, in block S312, the loopback determining module 104 determines if the first response link code word is equal to the second response link code word. If the first response link code word is equal to the second response link code word, then in the block S313, the loopback determining module 104 determines the Ethernet port 18 does not experience loopback. If the first response link code word is unequal to the second response link code word, then in the block S314, the loopback determining module 104 determines the Ethernet port 18 experiences loopback.

Figure 4:
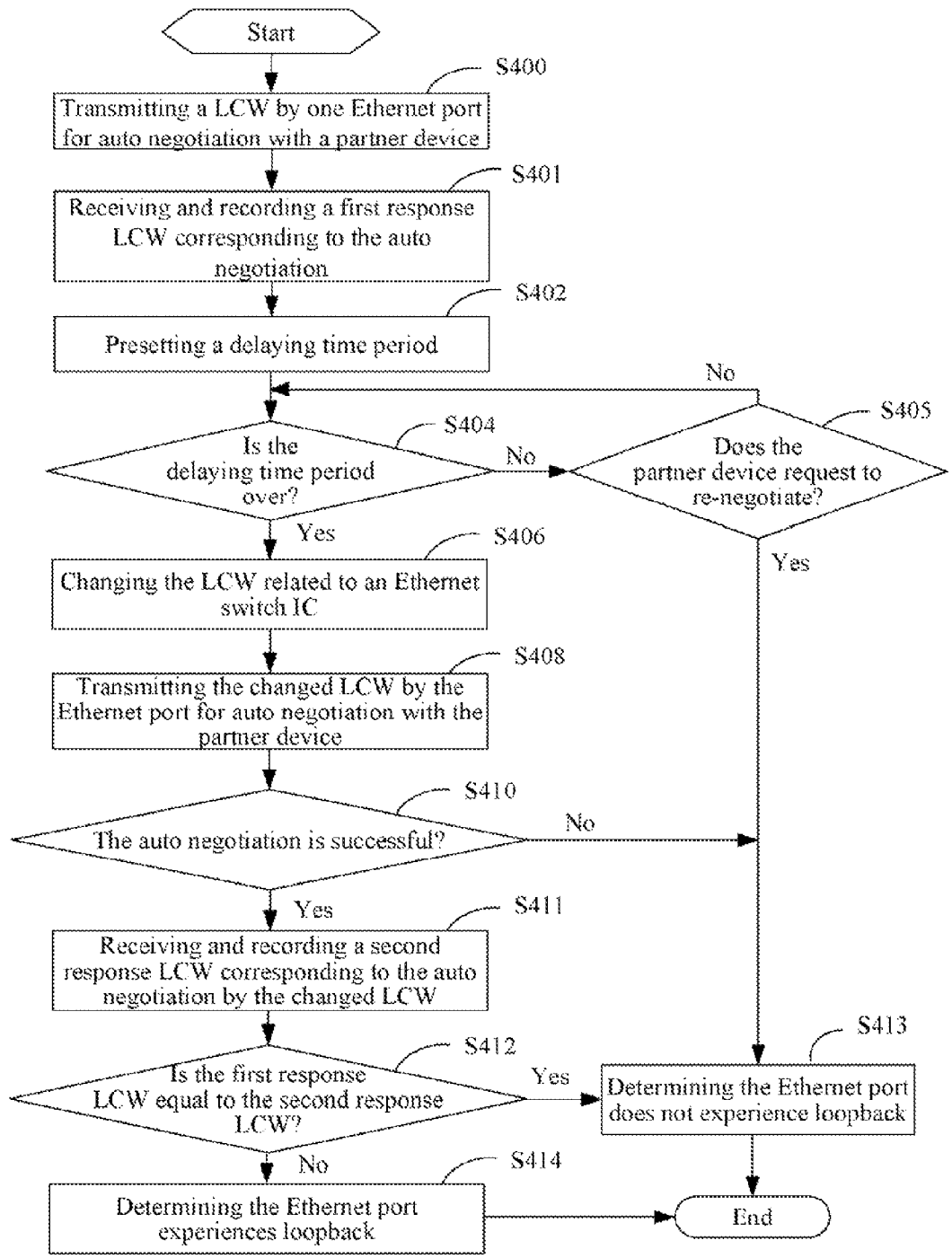
FIG. 4 is a flowchart of a loopback detecting method of another embodiment of the present disclosure.

Further, as the partner device 30 may also support the loopback detecting method of the present disclosure, the randomly changed link code word of the partner device 30 may be equal to that of the switching device 10 and the loopback determining module 104 may make a mistake in the loopback determination, although the error rate of the loopback determination is extraordinary low. FIG. 4 is a flowchart of a loopback detecting method of another embodiment of the present disclosure. The loopback detecting method of the embodiment of FIG. 4 can decrease the error rate of the loopback determination. The flowchart is primarily executed by the modules of FIG. 1.

In block S400, the automatic negotiation module 100 transmits a link code word related to the Ethernet switch IC 16 to the partner device 30 by one of the Ethernet ports 18 for automatic negotiation with the partner device 30. In block S401, the automatic negotiation module 100 receives and records a first response link code word. As such, if the Ethernet port 18 does not experience loopback, then the first response link code word is transmitted by the partner device 30. If the Ethernet port 18 experiences loopback, then the first response link code word is transmitted by the automatic negotiation module 100 itself.

In block S402, the delaying module 102 presets a delaying time period. In one embodiment, the delaying time period is randomly preset during a range of time, such as 1-10 seconds. In block S404, the delaying module 102 determines if the delaying time period is over. For example, the delaying time period is preset as 1 second, the delaying module 102 determines if 1 second is past from the preset of the delaying time period.

If the delaying time period is not over, then in block S405, the automatic negotiation module 100 determines if the partner device 30 requests to re-negotiate with the switching device 10 during the delaying time period. If the partner device 30 requests to re-negotiate with the switching device 10 during the delaying time period, then in block S413, the loopback determining module 104 determines the Ethernet port 18 does not experience loopback.

If the partner device 30 does not request to re-negotiate with the switching device 10 during the delaying time period, then in block S300, the changing module 101 changes the link code word related to the Ethernet switch IC 16 when the delaying time period is over. Block S406 to block S414 are respectively and substantially the same as block S306 to block S314. Therefore, the detail descriptions of Block S406 to block S414 are omitted for simplicity.

The switching device 10 and the loopback detecting method of the present disclosure detect the loopback of the switching device 10 by changing the link code word of the automatic negotiation. With the loopback detection, the switching device 10 can avoid damage to the switching IC 16 caused by the loopback failure.

In addition, the switching device 10 and the loopback detecting method of the present disclosure does not require any more hardware, which decreases the product cost and complexity of the switching device 10.

Further, the loopback detection of the present disclosure is detected during the automatic negotiation and does not require to be detected after the switching device 10 boots. Therefore, the switching device 10 and the loopback detecting method of the present disclosure can avoid the damage earlier.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A switching device in communication with a partner device, and comprising a plurality of Ethernet ports, an Ethernet switch integrated circuit (IC), a processor, a storage system, and one or more programs stored in the storage system and operable to be executed by the processor and comprising:

an automatic negotiation module that transmits a link code word related to the Ethernet switch IC to the partner device by one of the Ethernet ports for automatic negotiation with the partner device, and subsequently receives and records a first response link code word corresponding to the automatic negotiation;

a changing module that changes the link code word related to the Ethernet switch IC, wherein the automatic negotiation module further transmits the changed link code word to the partner device by the one of the Ethernet ports for automatic negotiation with the partner device, and determines if the automatic negotiation by the changed link code word is successful, and subsequently receives and records a second response link code word corresponding to the automatic negotiation by the changed link code word when the automatic negotiation by the changed link code word is successful;

a loopback determining module that determines the one of the Ethernet ports experiences loopback upon the condition that the first response link code word is unequal to the second response link code word, and further determines the one of the Ethernet ports does not experience loopback upon the condition that the first response link code word is equal to the second response link code word; and a delaying module that presets a delaying time period, wherein the automatic negotiation module further determines if the partner device requests to re-negotiate with the switching device during the delaying time period.

2. The switching device as claimed in claim 1, wherein the loopback determining module further determines the one of the Ethernet ports does not experience loopback upon the condition that the automatic negotiation by the changed link code word is unsuccessful.

3. The switching device as claimed in claim 1, wherein the loopback determining module further determines the one of the Ethernet ports does not experience loopback upon the condition that the partner device requests to re-negotiate with the switching device during the delaying time period.

4. The switching device as claimed in claim 1, wherein the changing module changes the link code word related to the Ethernet switch IC upon the condition that the partner device does not request to re-negotiate with the switching device during the delaying time period.

5. A loopback detecting method of a switching device, the switching device communicating with a partner device and comprising a plurality of Ethernet ports and an Ethernet switch integrated circuit (IC), the method comprising:

transmitting a link code word related to the Ethernet switch IC to the partner device by one of the Ethernet ports for automatic negotiation with the partner device;

receiving and recording a first response link code word corresponding to the automatic negotiation;

changing the link code word related to the Ethernet switch IC;

transmitting the changed link code word to the partner device by the one of the Ethernet ports for automatic negotiation with the partner device;

determining if the automatic negotiation by the changed link code word is successful;

receiving and recording a second response link code word corresponding to the automatic negotiation by the changed link code word if the automatic negotiation by the changed link code word is successful;

determining the one of the Ethernet ports experiences loopback if the first response link code word is unequal to the second response link code word, or determining the one of the Ethernet ports does not experience loopback if the first response link code word is equal to the second response link code word;

presetting a delaying time period;

determining if the partner device requests to re-negotiate with the switching device during the delaying time period; and changing the link code word related to the Ethernet switch IC if the partner device does not request to re-negotiate with the switching device during the delaying time period.

6. The method as claimed in claim 5, further comprising determining the one of the Ethernet ports does not experience loopback if the automatic negotiation by the changed link code word is unsuccessful.

7. The method as claimed in claim 5, further comprising determining the one of the Ethernet ports does not experience loopback if the partner device requests to re-negotiate with the switching device during the delaying time period.

* * * * *